United States Patent [19]
Allen, Jr.

[11] 3,879,846
[45] Apr. 29, 1975

[54] SURGICAL SUTURE CUTTER AND REMOVER

[76] Inventor: William Glenn Allen, Jr., 1811 Floyd Ave., Richmond, Va. 23220

[22] Filed: May 29, 1974

[21] Appl. No.: 474,178

[52] U.S. Cl.......................... 30/124; 7/1 P; 128/354
[51] Int. Cl............................................. B26b 11/00
[58] Field of Search........... 30/116, 124, 131; 7/1 P; 81/43; 128/318, 354

[56] References Cited
UNITED STATES PATENTS

| | | | |
|---|---|---|---|
| 2,696,621 | 12/1954 | Miller | 30/124 |
| 2,998,649 | 9/1961 | Miller | 30/131 |
| 3,624,683 | 11/1971 | Matles | 30/124 |
| 3,659,343 | 5/1972 | Straus | 30/124 |

Primary Examiner—Al Lawrence Smith
Assistant Examiner—J. C. Peters
Attorney, Agent, or Firm—D. Paul Weaver

[57] ABSTRACT

A combination implement for cutting and removing surgical sutures consists of a unitary body portion of springy material forming a forceps and a longitudinal suture cutting element extending between the arms of the forceps and being anchored to one arm and to the bight of the forceps body.

10 Claims, 8 Drawing Figures

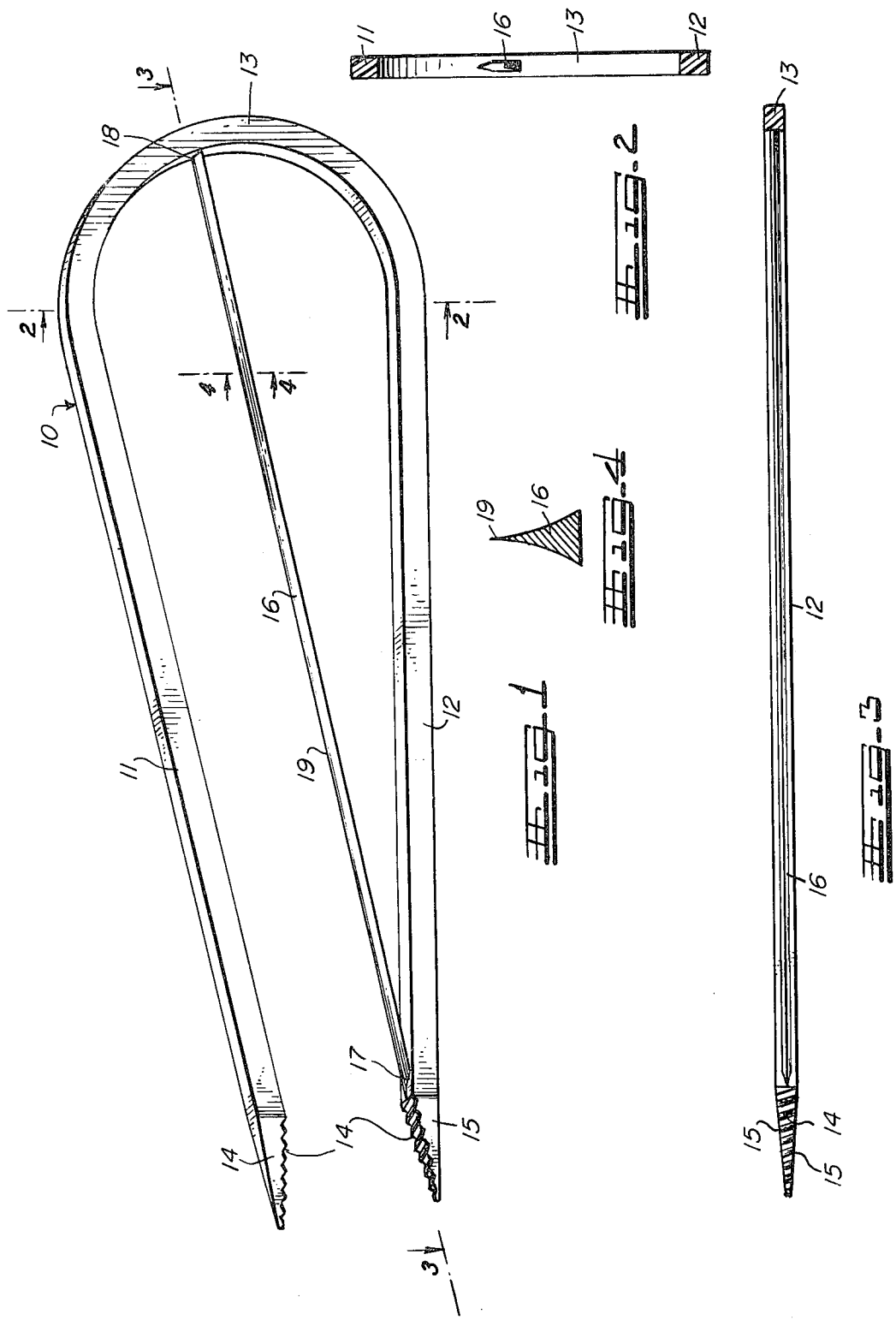

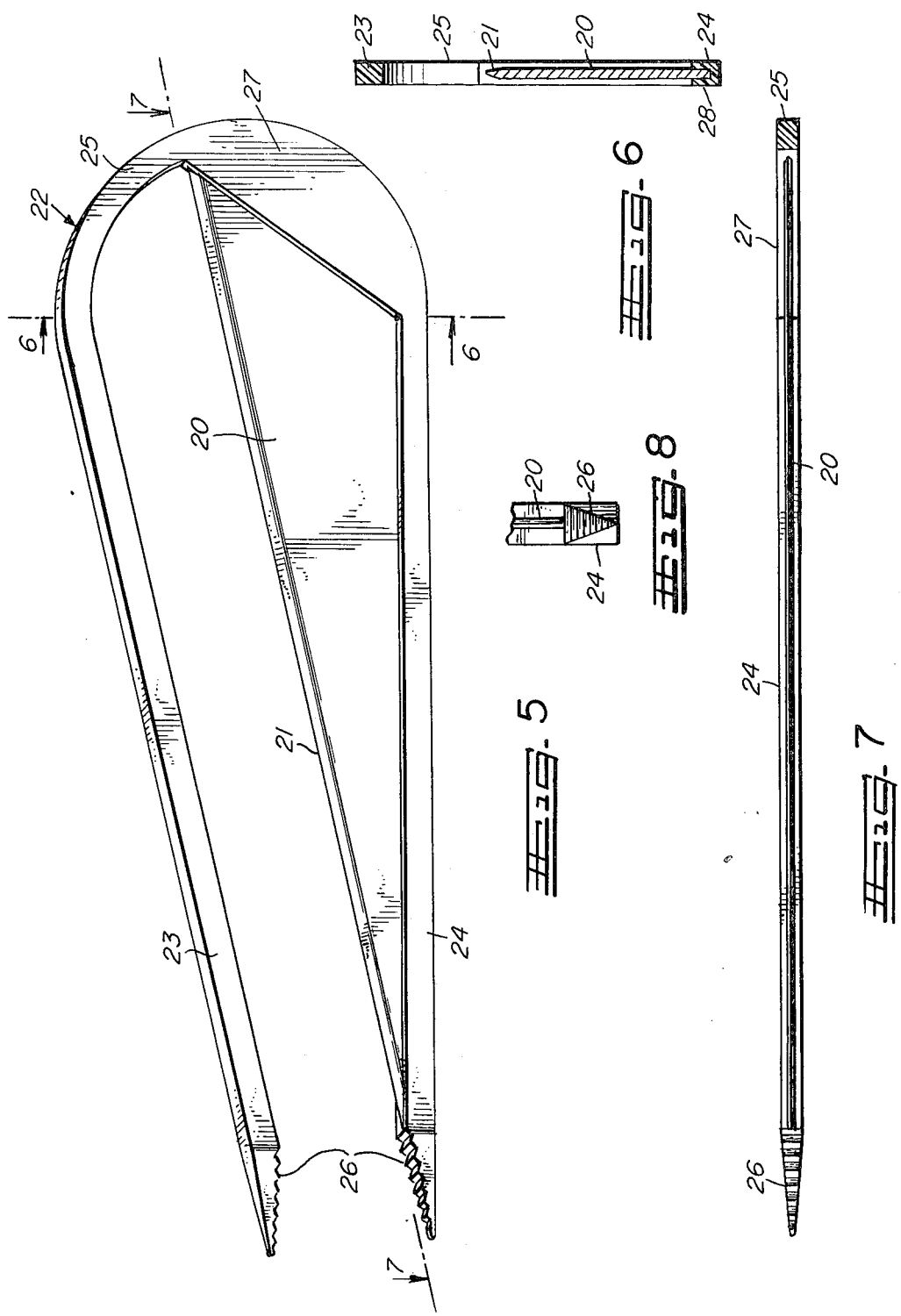

SURGICAL SUTURE CUTTER AND REMOVER

BACKGROUND OF THE INVENTION

The removal of stitches from a healed incision generally necessitates the use by a doctor of a suitable scissors and forceps or tweezers contituting a separate implement from the cutting implement. For the sake of convenience as well as economy, it would be desirable for the surgeon to have at hand a combination implement for this purpose, and therefore the objective of the invention is to provide such a combination implement or device for the cutting and removal of surgical sutures.

The device embodying the invention is of an extremely simple nature and well adapted to be formed from molded plastic with a cutting blade insert or a cutting wire element embedded therein during manufacturing or removably attached thereto.

The simplicity of the implement is such that it may be feasible to produce the same as a single use device in a sterile wrapper, allowing the implement to be discarded after usage. The structure could also be manufactured as a reusable implement of high quality.

Other features and advantages of the invention will become apparent during the cource of the following description.

BRIEF DESCRIPTION OF DRAWING FIGURES

FIG. 1 is a perspective view of a suture cutter and remover according to one form of the invention.

FIG. 2 is a vertical section taken on line 2—2 of FIG. 1.

FIG. 3 is a section taken on line 3—3 of FIG. 1.

FIG. 4 is a vertical section taken on line 4—4 of FIG. 1.

FIG. 5 is a perspective view showing a second embodiment of the invention.

FIG. 6 is a vertical section taken on line 6—6 of FIG. 5.

FIG. 7 is a further sectional view taken on line 7—7 of FIG. 5.

FIG. 8 is a fragmentary end elevational view of the implement.

DETAILED DESCRIPTION

Referring to the drawings in detail wherein like numerals designate like parts, the numeral 10 designates an implement body in the form of a forceps having a pair of elongated straight converging arms 11 and 12, integrally connected at their rear ends by an approximately semi-circular bight portion 13. The forceps body may be formed of any suitable spring-like material and certain well-known tough plastics are suitable for this purpose in that they possess a high degree of resiliency and toughness. The unitary body portion 10 may be of uniform cross section, such as rectangular, as indicated in FIG. 2.

At their leading free ends, the arms 11 and 12 are beveled on their opposing faces to form forceps jaws 14 which may be serrated, as shown, or smooth-faced. These jaws are also preferably tapered on opposite sides as at 15 for easier engagement with the sutures. When the forceps arms 11 and 12 are drawn together by the fingers for gripping a severed suture to remove it from the patient, the beveled jaws 14 will be parallel so as to firmly clamp or grip the suture. When the implement is in a free or relaxed state as shown in the drawings, the jaws 14 will automatically separate and will remain separated until drawn together by the user.

To allow cutting the sutures with the same implement prior to removal, a cutting element 16 in the form of a taut stainless steel wire or the like extends longitudinally between the arms 11 and 12 and preferably parallel to the free arm 11 when the forceps body 10 is relaxed. The element 16 converges in the forward direction with the arm 12 and has its forward end securely anchored to the interior side of the arm 12 as at 17 immediately rearwardly of the jaws 14. The rear end of the element 16 is similarly anchored at 18 to the bight portion 13, preferably at the center thereof. The anchoring of the taut cutting wire 16 to the forceps body may be accomplished by known techniques, such as by embedding the element during a plastic molding process. The sharp cutting edge 19 of wire element 16 faces or opposes the interior side of the arm 11.

In the use of the combination implement, the surgeon or doctor simply forces the tapered jaw 14 of arm 12 under the suture loop and gradually works the cutting edge 19 forwardly in the loop to sever it cleanly, the edge 19 being at approximately the same angle to the arm 12 as the adjacent jaw face 14. After severing the suture loop, the implement is employed as a forceps or tweezer to pull the severed loop from the flesh and remove it. Thus, there is no necessity to employ two separate implements for the clean removal of sutures and the entire procedure is simplified and rendered more convenient for doctor and patient.

FIGS. 5 through 8 show a modification of the invention wherein the suture cutting means is in the form of a blade insert 20 having a sharp straight cutting edge 21 in the same location relative to the other parts of the implement as described in connection with the wire cutting edge 19. The modified implement has a resilient forceps forming body portion 22 formed of plastic or other suitable material including arms 23 and 24, a bight portion 25 and gripping jaws 26, all substantially identical to the corresponding element of the previously-described implement 10.

The body portion 22 additionally contains a filler web 27 spanning the lower portion of the bight 25 and the rear part of blade 20 is embedded in, or suitably anchored to, the web 27. The lower longitudinal edge of blade 20 is seated fixedly within a groove 28 of arm 24 throughout the full length of this arm, up to the jaw 26. The blade may be permanently attached to the forceps body or may constitute a replaceable insert.

The use or operation of the implement for cutting and removing surgical sutures is exactly as previously described for the prior embodiment of the invention.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A combination suture cutter and remover comprising a unitary forceps body portion formed of spring-like material and including a pair of elongated forwardly converging arms and a rearward bight portion joining said arms, means forming suture gripping jaws on the forward ends of the arms whereby the jaws may be drawn together by a user of the device to grip a suture, and a suture cutting element disposed between said arms and extending longitudinally thereof and having a straight cutting edge in opposing relation to one of said arms, opposite ends of said cutting element being anchored to said bight portion and to the arm facing away from said cutting edge.

2. A combination suture cutter and remover as defined by claim 1, and said cutting element consisting of a taut wire extending approximately from the center of the bight portion to the forward end portion of one arm of the forceps body portion.

3. A combination suture cutter and remover as defined by claim 2, and the opposite ends of said wire being embedded in the material forming said bight portion and said one arm.

4. A combination suture cutter and remover as defined by claim 3, and said forceps body portion formed of plastic.

5. A combination suture cutter and remover as defined by claim 1, wherein said cutting element is a blade insert having a straight cutting edge extending from approximately the center of said bight portion to the forward end portion of one arm of the forceps body portion, said one arm and bight portion having recess means receiving said blade insert.

6. A combination suture cutter and remover as defined by claim 5, and said straight cutting edge facing and being substantially parallel to the arm of the forceps body portion remote from the blade insert.

7. A combination suture cutter and remover as defined by claim 2, and said taut wire being substantially parallel to the arm of the forceps body portion toward which said cutting edge faces, the forward end of the taut wire being disposed immediately rearwardly of said suture gripping jaws.

8. A combination suture cutter and remover as defined by claim 7, and said straight cutting edge disposed at an angle causing it to form a continuation of the adjacent jaw carried by the arm to which the forward end of said taut wire is anchored.

9. A combination suture cutter and remover as defined by claim 6, and said straight cutting edge of the blade insert disposed angularly in relation to the arm to which the blade insert is attached, whereby the cutting edge forms substantially a continuation of the suture gripping jaw on such arm.

10. A combination suture cutter and remover as defined by claim 1, wherein the straight cutting edge is approximately parallel to one arm of said forceps body portion when said body portion is in a relaxed state and is convergent with the opposite arm of the forceps body portion.

* * * * *